Aug. 30, 1949.  R. J. UHLIN  2,480,619
AIR PUMP

Filed Dec. 3, 1947  2 Sheets-Sheet 1

Inventor

Robert J. Uhlin

By Clarence A. O'Brien
and Harvey B. Jacobson
Attorneys

Aug. 30, 1949.  R. J. UHLIN  2,480,619
AIR PUMP
Filed Dec. 3, 1947  2 Sheets-Sheet 2
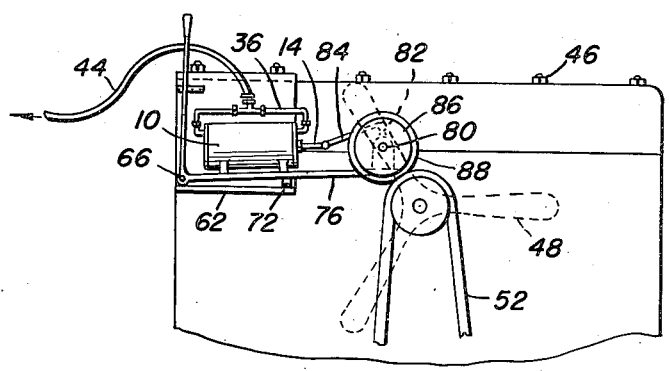
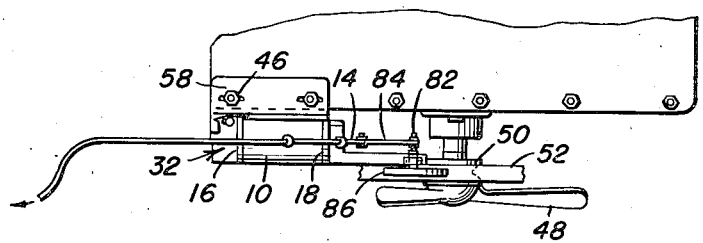
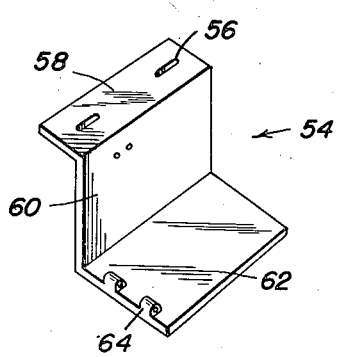
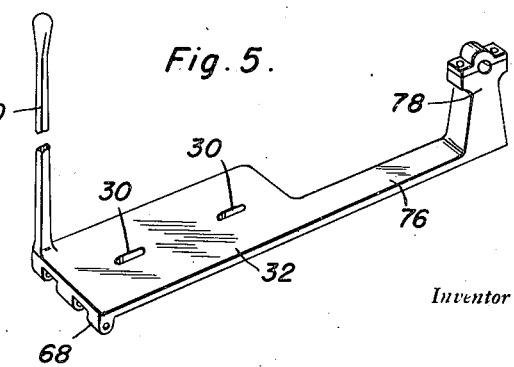
Inventor
Robert J. Uhlin
By Clarence A. O'Brien
and Harvey B. Jacobson
Attorneys Patented Aug. 30, 1949

2,480,619

UNITED STATES PATENT OFFICE 2,480,619

AIR PUMP

Robert J. Uhlin, Kansas City, Mo.

Application December 3, 1947, Serial No. 789,378

3 Claims. (Cl. 230—235)

1

This invention relates generally to air pumps for automotive vehicles, and more particularly to a mounting for such an air pump.

A primary object of this invention is to provide means whereby an air pump is operatively mounted on the engine of an automotive vehicle so that the fan belt is used for driving the air pump.

Another object of this invention is to provide simple and effective means for making the air pump completely inoperative during the normal operation of the vehicle.

Still another object of this invention is to provide convenient manual means whereby the air pump may be operatively connected with the fan belt when it is desired to inflate a tire, or when air pressure is desired for some other purpose such as cleaning upholstery or the like.

Another object of this invention is to provide an air pump and mounting which is adapted to be secured to the engine of an automotive vehicle without alteration of the engine or the necessity of special fittings or tubes.

Still another object of this invention is to combine an air pump with a fan belt, fan pulley and an engine in an automotive vehicle, so that the drive wheel of the air pump and the said pulley are in simultaneous contact with opposite sides of a portion of the fan belt, when the device is in operative position.

Yet another object of this invention is to provide a device including an air pump which is double acting and which will be smooth and steady in operation, easy of access for repair and adjustment and available for use at all times.

And the last object to be specifically mentioned is to provide an air pump and mounting which is relatively inexpensive and practicable to manufacture, extremely simple, convenient and safe to use, and which will give generally efficient and durable service.

With these objects definitely in view, together with other objects of a specific character which will become apparent as this description proceeds, this invention resides in certain novel features of construction, combination and arrangement of parts and portions as will be hereinafter described in the specification, particularly pointed out in the appended claims, and illustrated in the accompanying drawings which form a material part of this application, and in which:

Figure 2 is a front elevational view of this invention applied to an engine, the fan, fan belt and fan pulley being included in phantom lines in the figure to more clearly illustrate how this invention is applied to the engine of an automotive vehicle;

Figure 3 is a top plan view of the structure illustrated in Figure 2;

Figure 4 is a perspective view of the attaching bracket;

Figure 5 is a perspective view of the table whereon the air pump is mounted;

Similar characters of reference designate similar or identical parts throughout the specification and throughout the several views of the drawings.

Figure 1:
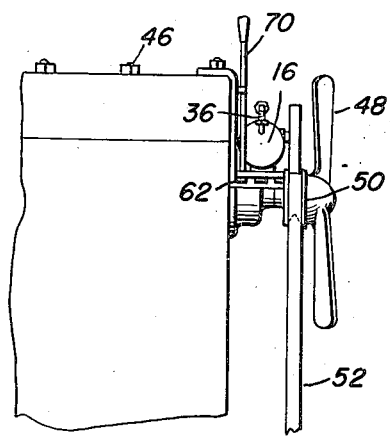
Figure 1 is a side elevational view of this invention applied to the fore-part of an automotive engine.
Figure 7:
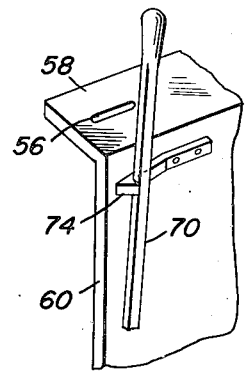
Figure 7 is a fragmentary enlarged detail view of a portion of the bracket and designed to illustrate how the handle on the table is held against movement in one direction.
Figure 6:
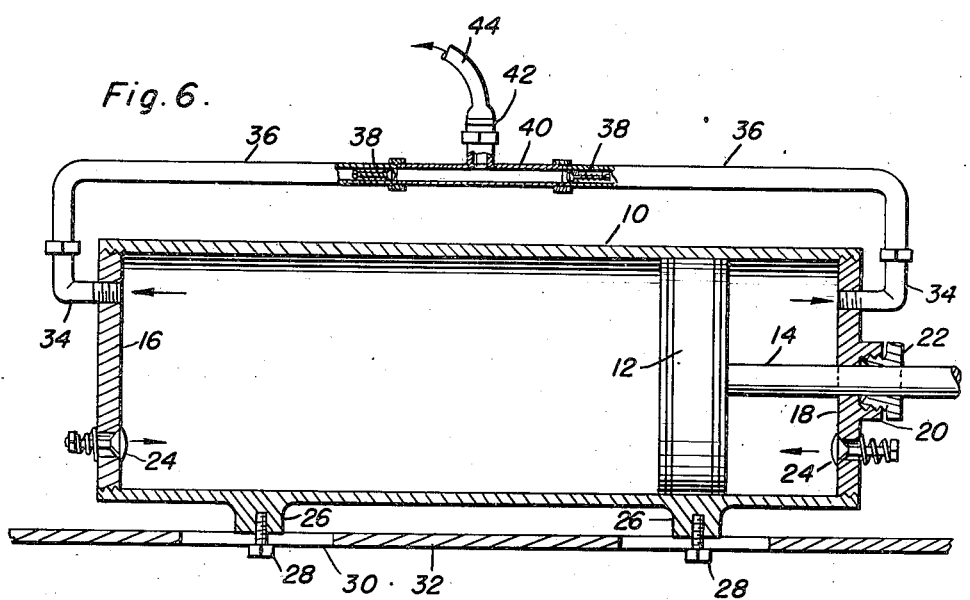
Figure 6 is a vertical longitudinal sectional view taken through the longitudinal center line of the air pump.
Figure 8:
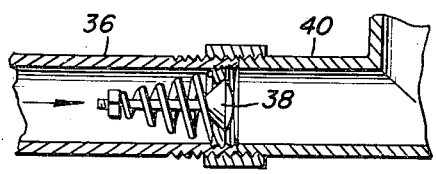
Figure 8 is an enlarged fragmentary detail view of one of the valves in the air pump.

Referring now to the drawings in detail envisages the use of an air pump, best illustrated in Figures 6 and 8, and including a cylinder 10, a piston 12, and a piston rod 14. The cylinder is closed at the ends by threaded end plates 16 and 18, and the end plate 18 is apertured and provided with a suitably threaded boss 20 to receive the piston rod 14 and a gland nut 22. Each end plate carries an air inlet valve 24 and these air inlet valves operate alternately when the piston 12 is reciprocated, in a well known manner of a double acting pump.

The cylinder is provided with attachment bosses 26 on the lower side thereof and attachment screws 28 having enlarged heads are inserted through slots 30 in the table 32 hereinafter described, for adjustable mounting of the air pump on this table. Air outlet nipples 34 are threadedly secured to the end plates 16 and 18 and are connected to air outlet pipes 36 which have check valves 38 operatively mounted therein, and a T-coupling 40 with an attachment nipple 42 is provided whereby a flexible hose 44 may be connected to the pump.

The environment wherewith this invention is adapted to be used will include an engine having head bolts 46, or the like, a fan 48 having a fan pulley 50 and a driving fan belt 52.

A bracket, generally indicated by the numeral 54 is secured on the front end of the engine by means of the bolts 46 inserted through apertures 56 in the top flange 58 of the bracket. The bracket also includes a vertical panel 60 and an integral horizontally disposed plate 62 having hinge bosses 64 at one end and on the upper surface thereof. The hinge bosses 64 are, of course, bored to receive a hinge pin 66 which is also inserted through cooperating hinge bosses 68 formed integral with one end of the table 32.

It will be understood that the air pump is longitudinally adjustably mounted on the table 32 and that this table is adapted for pivotal movement relative to the plate 62, such pivotal movement being controlled by a handle 70 on said one end of the table 32 and a spring 72 compressed between the upper surface of the plate 62 and the under surface of the table 32, as best illustrated in Figure 2. A small spring catch 74 is mounted on the vertical panel 60 of the bracket to limit the movement of this handle 70 in one direction.

An extending portion 76 of the table 32 has an upstanding bearing 78 mounted thereon, and this bearing has mounted therein a shaft 80 which is continued as a bellcrank 82 disposed on the end of the shaft 80 remote from the fan 48. A pitman shaft 84 is terminally mounted on this bellcrank 82 and on the piston rod 14, by means of suitable pivot connections. A drive wheel 86 is rigidly secured to the opposite end of the shaft 80 and this drive wheel will preferably be constructed with a tire of somewhat resilient material for engagement with the fan belt 52.

The operation of this invention will be clearly understood from the foregoing description of the mechanical details thereof, taken in connection with the above recitation of the objects sought to be achieved by this invention. In recapitulation, it need only be added that when the device is to be used, the handle 70 is used to tilt the table 32 so that the drive wheel 86 is brought into contact with the fan belt 52, thus operating the air pump. At other times the air pump is held in inoperative position by the action of the spring 72.

Many minor variations may be made in the exact construction and the proportionment of the various elements of this invention and such variation is within the spirit and scope of this invention which should be limited only in accordance with a proper interpretation of the terms and on the subjoined claims.

Having described the invention, what is claimed as new is:

1. An air pump mounting for motor vehicles, comprising a bracket, a table hinged to said bracket, a spring compressed between said table and said bracket to bias the table into one position, a friction drive wheel rotatively mounted on said table for engagement with a fan belt when the table is in one position, means for adjustably mounting an air pump on said table, a hand lever on said table for pivotally shifting the table relative to the bracket, and a catch on the bracket to hold the lever so that the table is held in said one position.

2. An air pump assembly for motor vehicles having an engine with a fan pulley and fan belt, comprising a bracket adjustably secured to said engine adjacent a fan pulley, a table hinged to said bracket for movement about an axis parallel the axis of said pulley, a friction drive wheel rotatively mounted on said table for engagement with a fan belt when the table is in one position, an air pump adjustably mounted on said table, an eccentric drive means operatively connecting said drive wheel with said pump, a spring compressed between said table and said bracket to hold the drive wheel normally out of engagement with said belt, a hand lever on said table for moving said table so that said wheel is moved selectively into operative engagement with said belt and out of engagement with said belt, and catch means for the lever for positively preventing engagement of the wheel with said belt.

3. The combination of a device according to claim 1, with a fan belt, fan pulley, and an engine, wherein said drive wheel and said pulley are in simultaneous contact with opposite sides of a portion of said fan belt, when the table is in a second position.

ROBERT J. UHLIN.

REFERENCES CITED

The following references are of record in the file of this patent:

UNITED STATES PATENTS

| Number | Name | Date |
| --- | --- | --- |
| 267,653 | Ring | Nov. 14, 1882 |
| 1,065,152 | Marble et al. | June 17, 1913 |
| 1,223,682 | Fefelle | Apr. 24, 1917 |
| 1,382,018 | Schreiber | June 21, 1921 |